United States Patent
Yadav et al.

(10) Patent No.: US 10,956,041 B2
(45) Date of Patent: Mar. 23, 2021

(54) ONLINE SNAPSHOT CONSOLIDATION USING I/O MIRRORING

(71) Applicant: VMware, Inc., Palo Alto, CA (US)

(72) Inventors: Nishant Yadav, Mountain View, CA (US); Jesse Pool, Mountain View, CA (US); Li Zheng, Palo Alto, CA (US); Gabriel Tarasuk-Levin, Sunnyvale, CA (US); Nick Michael Ryan, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 743 days.

(21) Appl. No.: 14/528,276

(22) Filed: Oct. 30, 2014

(65) Prior Publication Data

US 2015/0378636 A1 Dec. 31, 2015

Related U.S. Application Data

(60) Provisional application No. 62/017,479, filed on Jun. 26, 2014.

(51) Int. Cl.
*G06F 3/06* (2006.01)

(52) U.S. Cl.
CPC ............ *G06F 3/0608* (2013.01); *G06F 3/061* (2013.01); *G06F 3/065* (2013.01); *G06F 3/0652* (2013.01); *G06F 3/0689* (2013.01)

(58) Field of Classification Search
CPC ..... G06F 3/0626; G06F 3/0647; G06F 3/0685
USPC .................. 707/645, 648, 655–660; 711/114
See application file for complete search history.

(56) References Cited

U.S. PATENT DOCUMENTS

| | | | |
|---|---|---|---|
| 7,356,679 B1 | 4/2008 | Le et al. | |
| 2009/0037680 A1* | 2/2009 | Colbert | G06F 3/0617 711/162 |
| 2009/0216975 A1 | 8/2009 | Halperin et al. | |
| 2009/0265706 A1 | 10/2009 | Golosovker et al. | |
| 2009/0327603 A1* | 12/2009 | McKean | G06F 3/0617 711/114 |
| 2010/0049929 A1* | 2/2010 | Nagarkar | G06F 9/45533 711/162 |
| 2010/0186014 A1 | 7/2010 | Vaghani et al. | |
| 2012/0284234 A1* | 11/2012 | Mashtizadeh | G06F 17/30233 707/655 |
| 2013/0290661 A1* | 10/2013 | Reuther | G06F 3/0647 711/162 |
| 2014/0095823 A1 | 4/2014 | Shaikh et al. | |

(Continued)

OTHER PUBLICATIONS

Janssen, Cory, "Incremental Backup", Techopedia, retrieved Jul. 2, 2013 via the WayBack Machine.*

(Continued)

*Primary Examiner* — Reginald G Bragdon
*Assistant Examiner* — Aaron D Ho

(57) ABSTRACT

To create a backup of a live (running) virtual machine, a backup agent may take a snapshot of the virtual machine, backup the virtual machine from the snapshot disk, and delete the snapshot. Deleting the snapshot initiates a snapshot consolidation process where delta disks of the virtual machine are collapsed. A virtual disk layer sets up a mirror driver between a current virtual disk and a target virtual disk. Data sectors of the delta disk are copied over to the target virtual disk in a single pass, while the mirror driver mirrors write request for the current virtual disk to the target virtual disk.

20 Claims, 4 Drawing Sheets

(56) References Cited

U.S. PATENT DOCUMENTS

| | | | | |
|---|---|---|---|---|
| 2014/0297979 A1* | 10/2014 | Baron | ............... | G06F 3/0647 |
| | | | | 711/162 |
| 2015/0234617 A1* | 8/2015 | Li | ............... | G06F 3/0647 |
| | | | | 711/114 |

OTHER PUBLICATIONS

Unknown author, "Incremental Backup", TechTarget, Aug. 11, 2010 version retrieved Mar. 9, 2011 via the WayBack Machine.*
Simon, Nathan, "Understanding VMware Snapshots", Oct. 7, 2009, TechTarget.*
Unknown author, "vSphere Virtual Machine Administration Guide", updated Jan. 27, 2012, pp. 144-145.*
Duncan Epping, "vSphere 5.0: Storage vMotion and the Mirror Driver", vSphere 5 Clustering Technical Deepdive, Jul. 14, 2011, available at <http://www.yellow-bricks.com/2011/07/14/vsphere-5-0-storage-vmotion-and-the-mirror-driver/>.
Vmware, Inc., "What's New in VmWare vSphere 5.0—Storage", v 1.0, May 2011. available at <http://www.vmware.com/files/pdf/techpaper/Whats-New-VMware-vSphere-50-Storage-Technical-Whitepaper.pdf>.
Mashtizadeh et al., "The Design and Evolution of Live Storage Migration in VMware ESX", Jun. 17, 2011, pp. 1-14.

* cited by examiner

ONLINE SNAPSHOT CONSOLIDATION USING I/O MIRRORING

CROSS-REFERENCE TO RELATED APPLICATION(S)

This application claims the benefit of U.S. Provisional Patent Application No. 62/017,479, filed Jun. 26, 2014, the entire contents of which are incorporated by reference herein.

BACKGROUND

Computer virtualization is a technique that involves encapsulating a physical computing machine platform into a virtual machine that is executed under the control of virtualization software on a hardware computing platform, or "host." A virtual machine has both virtual system hardware and guest operating system software. Virtual system hardware typically includes at least one "virtual disk," which is represented as a single file or a set of files in the host's file system, and appear as a typical storage drive to the guest operating system. The virtual disk may be stored on the host platform's local storage device (if any) or on a remote storage device. Typically, a virtual machine uses the virtual disk in the same manner that a physical storage drive is used, to store the guest operating system, application programs, and application data.

A snapshot of the virtual disk can be taken at a given point in time to preserve the content within the virtual disk at that point in time, referred to herein as a "point in time (PIT) copy of the virtual disk." Once a snapshot of a virtual disk is created, subsequent writes received from the guest operating system to the virtual disk are captured in a "delta disk" so that the preserved content, i.e., the base PIT copy, is not modified. The delta disk is an additional file associated with the virtual disk. At any given time, it represents the difference between the current state of the virtual disk and the state at the time of the previous snapshot. Thus, the base PIT copy remains intact and can be reverted back to or can be used as a base template to create writable virtual disk clones. Multiple PIT copies of the virtual disk can be created at various points in time by creating snapshots of snapshots. Each snapshot corresponds to a separate delta disk that is overlaid on a previous delta disk.

Creating multiple snapshots of a virtual disk results in a long chain of delta disks, each corresponding to a snapshot of the virtual disk. Every read I/O operation to the virtual disk has to traverse through each delta disk associated with the virtual disk to get the latest copy of the data from a delta disk. Therefore, an increased number of delta disks negatively impacts the performance of read I/O operations to the virtual disk. Performance of such I/O operations may be increased when redundant delta disks are consolidated to reduce the number of delta disk in a given chain. Redundant delta disks are associated with PIT copies of the virtual disk that are no longer needed. For example, a PIT copy of the virtual disk may be created for backing up or testing purposes and becomes redundant upon backup completion or when the testing is successful.

Delta disks are consolidated by merging PIT copies such that a particular delta disk can be deleted. Merging the PIT in copies typically involves copying out data from the delta disk to be deleted (the "source delta disk") to the main primary disk or an adjacent delta disk (either, referred to generally as the "destination delta disk"). Copying data in such a manner from the source delta disk to the destination delta disk involves data movement operations that cost a significant amount of I/O and CPU resources. As the size of data in the source delta disk increases, the data movement operations that are necessary to consolidate two delta disks become very I/O intensive. Thus, during consolidation, the I/O performance for the virtual disk as a whole degrades drastically when a delta disk consolidation operation is in process. In some cases, the consolidation process might fail altogether depending on the I/O workload of the virtual disk itself.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more embodiments disclosed herein provide methods, systems, and computer programs for consolidating snapshots of a virtual machine using a mirror driver. During a consolidation operation, a virtual machine is stunned (i.e. briefly suspended), and a mirror driver is interposed between a current, running disk and a target disk to which the running disk has to be consolidated. In cases where the target disk is a delta disk, a "pseudo" copy-on-write device node is created to represent a subset of the disk chain comprised of the target disk and the target disk's parents, i.e., excluding the delta disk to be consolidated. After the pseudo copy-on-write device node is created, reads and writes to the target disk may flow through the pseudo copy-on-write device node. In cases where the target disk is a flat file, read and write operations may simply be performed directly on that flat file.

Once the mirror driver is set up, write operations by the guest can be sent to both the current disk and the consolidation target disk. Subsequently, the VM is un-stunned, and disk data from sectors of the current disk are copied to the target disk. Meanwhile, the mirror driver takes care of sending I/O's to both the target disk handle and the current running disk handle. This method does not require any helper disks and completes in a single pass, thereby guaranteeing convergence.

Figure 1:
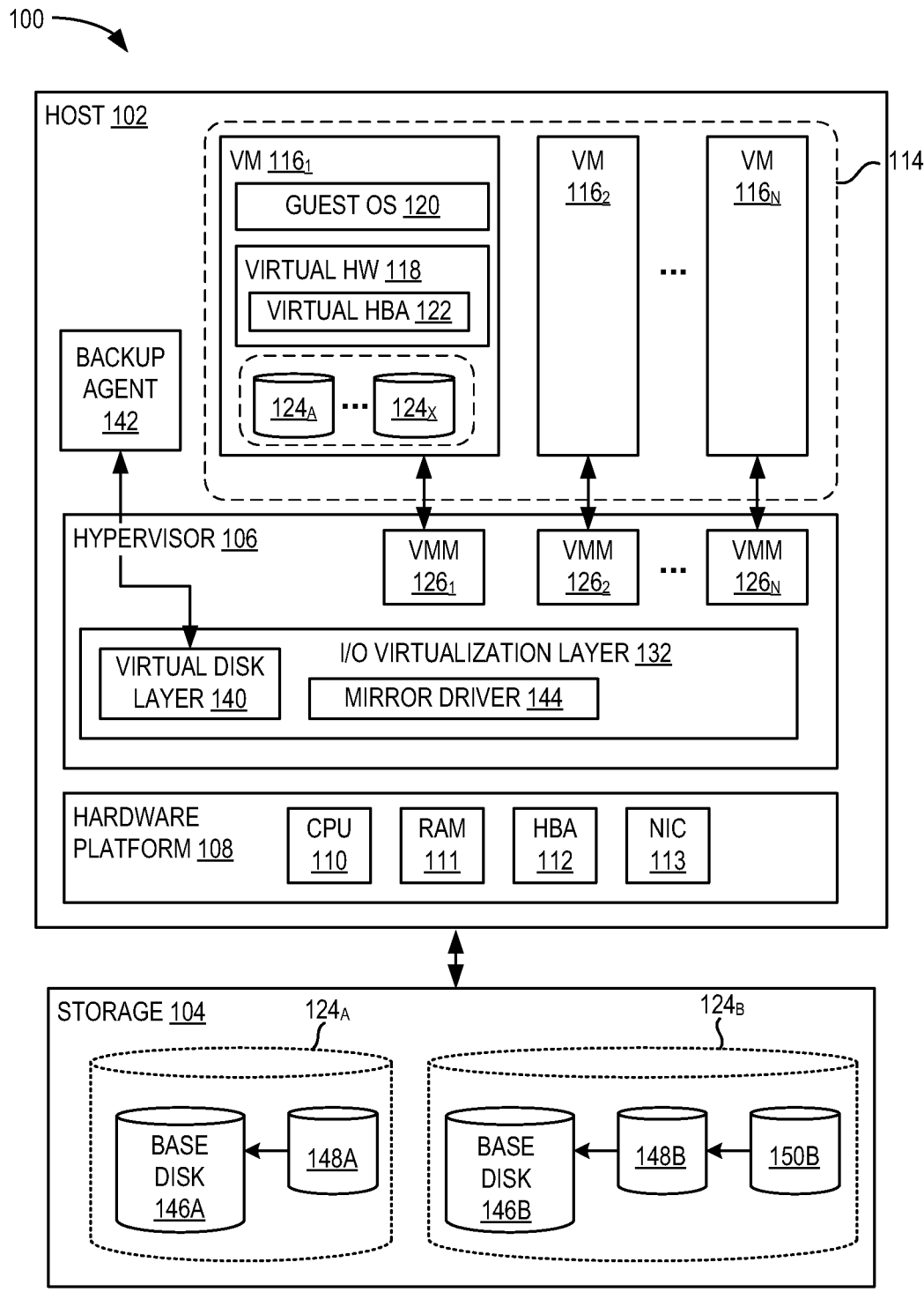
FIG. 1 is a block diagram that illustrates a computer system in which one or more embodiments may be utilized.

FIG. 1 is a block diagram that illustrates a computer system 100 according to one or more embodiments of the present disclosure. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. VMs 116 run on top of a software interface layer, referred to as a hypervisor 106, that enables sharing of the hardware resources of host 102 by VMs 116. One example of hypervisor 106 is a VMware ESXi hypervisor provided as part of the VMware vSphere solution made commercially available from VMware, Inc.

Host 102 may comprise a general purpose computer system having one or more virtual machines accessing data stored on a storage system 104 communicatively connected to host 102. Host 102 may be constructed on a conventional, typically server-class, hardware platform 108. Hardware platform 108 of host 102 may include conventional components of a computing device, such as a processor (CPU) 110, a memory 111, a disk interface 112, and a network interface 113. Processor 110 is configured to execute instructions, for example, executable instructions that perform one or more operations described herein and may be stored in memory 111. Memory 111 and storage system 104 are devices allowing information, such as executable instructions, cryptographic keys, virtual disks, configurations, and other data, to be stored and retrieved. Memory 111 may include, for example, one or more random access memory (RAM) modules. Storage system 104 may include one or more locally attached storage devices, for example, one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Disk interface 112, such as a host bus adapter (HBA), enables host 102 to communicate with a storage device, such as storage system 104, to store "virtual disks" that are accessed by VMs 116, as described later. Network interface 113 enables host 102 to communicate with another device via a communication medium, such as a communication network (not shown). An example of network interface 113 is a network adapter, also referred to as a Network Interface Card (NIC).

As shown in FIG. 1, a hypervisor 106 is installed on top of hardware platform 108 and supports a virtual machine execution space 114 within which multiple virtual machines (VMs) 116$_1$-116$_N$ may be instantiated and executed. Each such virtual machine 116$_1$-116$_N$ implements a virtual hardware platform 118 that supports the installation of a guest operating system (OS) 120 which is capable of executing one or more applications (not shown). Examples of a guest OS 120 include any of the well-known commodity operating systems, such as Microsoft Windows, Linux, and the like. In each instance, guest OS 120 includes a native file system layer, for example, either an NTFS or an ext3 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks 124$_A$-124$_X$) to enable execution of guest OS 120 transparent to the virtualization of the system hardware.

A virtual disk 124 exposes the same abstraction as a real (physical) disk, that is, a linear list of sectors; however, a VMM may choose to implement virtual disks 124 as regular files on the host. Since a virtual disk file represents the sector-by-sector contents of a disk, it is by definition a type of sector-based image file. In certain embodiments, virtual disks 124$_A$-124$_X$ may appear to support, from the perspective of guest OS 120, the SCSI standard for connecting to the virtual machine or any other appropriate hardware connection interface standard known to those with ordinary skill in the art, including IDE, ATA, and ATAPI. Although, from the perspective of guest operating systems 120, file system calls initiated by such guest operating systems 120 to implement file system-related data transfer and control operations appear to be routed to virtual disks 124$_A$-124$_X$ for final execution, in reality, such calls are processed and passed through virtual HBA 122 to adjunct virtual machine monitor (VMM) layers 126$_1$-126$_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 112 or NIC 113 that connect to storage system 104.

In one embodiment, I/O virtualization layer 132 of hypervisor 106 receives a data transfer and control operation (in the form of I/O commands, for example, intended for a virtual disk) from VMM layers 126$_1$ to 126$_N$, and converts the operations into file system operations that are understood by a virtual machine file system (VMFS) in order to access a file stored in underlying storage under the management of VMFS that represents virtual disk 124. In one embodiment, the file(s) representing virtual disk 124 conforms to the VMware Virtual Disk (VMDK) file format promulgated by VMware, Inc. for virtual disks, although alternative virtual disk file formats may be used in other embodiments. I/O virtualization layer 132 then issues these file system operations to VMFS (not shown). VMFS, in general, manages creation, use, and deletion of files (e.g., such as .vmdk files representing virtual disks) stored on physical locations of, or in logical volumes or Logical Unit Numbers (LUNs) exposed by, storage system 104. VMFS converts the file system operations received from I/O virtualization layer 132 to raw SCSI operations, which are issued to a data access layer that applies command queuing and scheduling policies to the raw SCSI operations and ultimately sends the raw SCSI operations to components of physical hardware platform 108.

The various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

As mentioned above, virtual disks 124$_A$-124$_X$ (collectively referred to as virtual disks 124) are disk images for corresponding VMs 116$_1$-116$_N$ residing as one or more files on storage system 104. A VMM 126 may implement a virtual disk 124 using a sparse, sector-based image format. This design can keep virtual disk files small if the amount of data written to the disk is smaller than the disk's capacity. For instance, when a user creates a virtual machine, they may specify the capacity of the virtual disk. The VMM then defines this disk to be filled entirely with sectors containing all zeroes. A newly created sparse virtual disk file is thus small in size, regardless of its capacity. When the user runs the virtual machine and installs software in it, including a guest operating system, the virtual disk file will grow in size, but only to the extent needed to hold the file system metadata and data generated by the guest. A sparse disk does not have a logical-to-physical mapping as does a flat disk, or even a thinly provisioned disk.

Most existing virtual machine products, such as those sold by VMware, Inc., of Palo Alto, Calif., employ a copy-on-write technique to allow a virtual machine to modify its virtual disk without actually modifying its virtual disk file. Copy-on-write enables a virtual machine user to preserve the state of a virtual disk for backup purposes or discard changes to a virtual disk in case the changes are temporary or contain accidental modifications to files. When copy-on-write is enabled for a virtual disk, modifications to the file are stored in a separate file, referred to herein as a delta disk and also known as a redo log, delta link, or child disks. A delta disk may comprise a redo log or other "differences" file that specifies which sector locations in the original "base" disk were written and contains the modified contents for those locations. A delta disk, combined with the original virtual disk the delta disk is derived from, represents a second, logical disk whose contents are defined as the original disk's contents with the exception of the modified sectors specified in the delta disk. Examples of delta disks are described in more detail in U.S. Pat. No. 7,356,679. In the embodiment shown in FIG. 1, a virtual disk $124_A$ corresponding to a VM $116_1$ includes a base disk 146A and a delta disk 148A which contains modified contents changed to base disk 146A since a snapshot was taken of base disk 146A. It is noted that, in embodiments described herein, the base disk of a disk chain may be a thick or thinly provisioned virtual disk, although other virtual disk formats may be used.

Delta disks may also be "chained" as a sequence of delta disks, each of which records writes to a virtual disk since the most recent preceding snapshot. In the embodiment shown in FIG. 1, a second virtual disk $124_B$ corresponding to another VM $116_2$ includes a disk chain comprised of a base disk 146B, a first delta disk 148B, and a second delta disk 150B. First delta disk 148B records changes to base disk 146B, i.e., the initial state of virtual disk $124_B$; second delta disk 150B records writes after a snapshot is taken of first delta disk 148B; and so on. Snapshots of a virtual disk may be "consolidated" (sometimes referred to as "committed") by incorporating into the virtual disk the writes record in all delta disks up to and including the chosen snapshot. Consolidating virtual disks reduces space consumptions and improves VM performance, as fewer disks in a disk chain need to be traversed to service disk access requests.

According to one embodiment, I/O virtualization layer 132 may include a virtual disk layer 140 that provides applications with access to virtual disk storage. Virtual disk layer 140, in response to requests from applications via an application programming interface (API), may create virtual machine disk files (e.g., .vmdk files), provide read and write access to a virtual disk, and create and delete snapshots of virtual disks. In one particular implementation, virtual disk layer 140 may be a pre-packaged library or API having a plurality of functions and methods that may be invoked by applications, and an example of which includes Virtual Disk Development Kit (VDDK) made available by VMware, Inc. of Palo, Alto, Calif.

In some cases, VM snapshots may be used to take a backup of a live (i.e., running) VM. In the embodiment shown, a backup agent 142 (e.g., executing as an application on host 102) is configured to backup virtual disks 124 of VMs 116 to a backup storage system (not shown). To backup a live VM, backup agent 142 may use virtual disk layer 140 to create a VM snapshot, backup the VM using the snapshot, and then delete the snapshot. Deleting a snapshot initiates the snapshot consolidation process where redundant disks are collapsed.

Using known techniques for "online" snapshot consolidation, delta disks that act as helper writable disks are created, which a running VM can write to during the consolidation operation to minimize downtime. In the background, redundant disk blocks are asynchronously combined, and links in a disk chain that are no longer needed are removed without interrupting the running VM. This process is repeated iteratively, creating additional helper writable disks and combining the disks until the helper disk has converged to a size small enough to be synchronously combined within a threshold duration, i.e., a few seconds. The VM is stunned, and the disk blocks of the final helper disk are synchronously combined. The time required to perform the synchronous combine may be estimated based on times taken during previous iterations. However, if the time to combine fails to converge (to the threshold duration) after trying for a maximum number of iterations, the consolidation process fails. It is noted that such known techniques may be prone to failure when the workload of the VM is I/O intensive, as the combine time never converges, resulting in consolidation failure, and unconsolidated disks. As mentioned above, the existence of unconsolidated disks causes performance degradation and wastes in storage resources.

Single-Pass In-Place Snapshot Consolidation

Accordingly, embodiments of the present disclosure describe techniques for performing consolidation of snapshots of a running VM using a mirror driver 144. In one embodiment, mirror driver 144 is a module residing within hypervisor 106 which may be enabled for a target VM having a virtual disk to be consolidated. In one implementation, mirror driver 144 may be implemented as an I/O filter driver within I/O virtualization layer 132 through which read and writes requests from guest OS 120 are passed. Mirror driver 144 is configured to synchronously mirror writes from a guest OS 120 in the target VM between a running virtual disk and a target virtual disk to which the running disk has to be consolidated. Mirror driver 144 is configured to replicate these writes from the guest OS while virtual disk layer 140 copies sectors from the running disk to the target disk in a single pass, without requiring multiple iterations.

Figure 2:
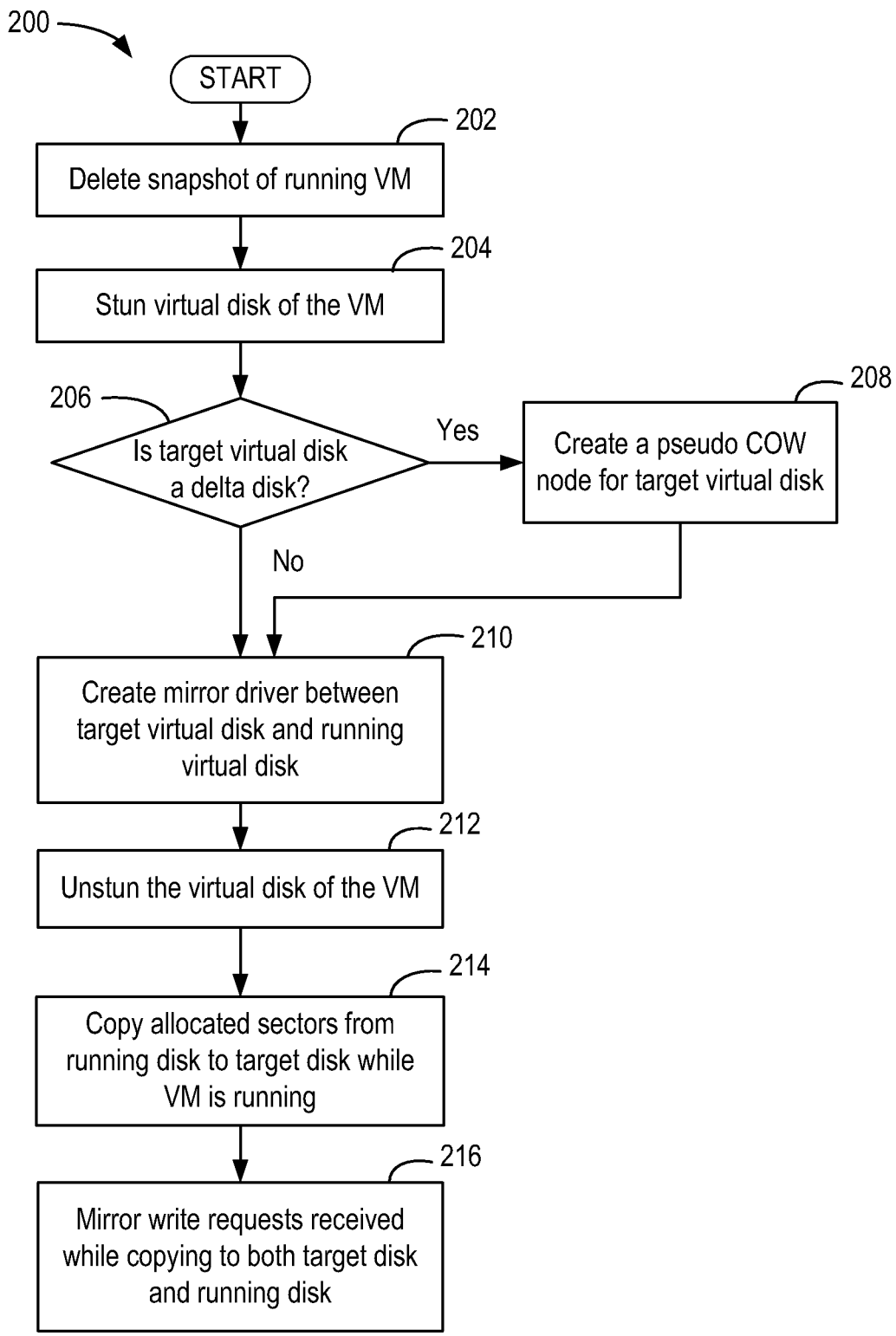
FIG. 2 is a flow diagram depicting a method for consolidating snapshots of a running virtual machine, according to one embodiment of the present disclosure.

FIG. 2 is a flow diagram depicting a method 200 for consolidating snapshots of a running VM, according to one embodiment of the present disclosure. In one embodiment, the running VM uses a virtual disk that has one or more snapshots taken of the virtual disk. That is, the virtual disk comprises a disk chain having a base disk and one or more delta disks. One of the snapshots is deleted, causing consolidation of a corresponding delta disk into the disk chain. In some cases, as mentioned above, the snapshot may be deleted by backup agent 142 after being used to backup a running VM from the snapshot. In other cases, the snapshot may be deleted in response to user input, for example, through a snapshot manager utility application. While method 200 is described in conjunction with components of the system shown in FIG. 1, other components in computer system 100 may perform the steps of method 200, as well as other systems may perform the described method.

Method 200 begins at step 202, virtual disk layer 140 deletes a snapshot including snapshot metadata from a virtual disk of a running VM. In one embodiment, virtual disk layer 140 deletes snapshot metadata contained in a file stored in storage system 104 associated with the snapshot.

For example, in one implementation, virtual disk layer 140 may modify a "snapshot database" file (e.g., .vmsd file) that is a database of the running VM's snapshot information. Virtual disk layer 140 may remove any entries contained in the snapshot database file which define the snapshot to be deleted in relation to other snapshots, as well as any entries defining particular delta disks for the snapshot to be deleted. It is noted that though the snapshot metadata is deleted and the snapshot itself is considered "deleted," one or more files (e.g., –00000X-delta.vmdk files) containing disk data of the deleted snapshot remain in storage system 104.

At step 204, virtual disk layer 140 stuns the virtual disk of the running VM. In some embodiments, virtual disk layer 140 stuns (or "quiesces") the guest file system of the running VM by flushing dirty buffers of the guest OS's in-memory cache to disk. In some embodiments, virtual disk layer 140 may stun the virtual disk of the running VM for a period of time sufficient to allow any in-flight I/O operations for the virtual disk to quiesce or clear. In alternative embodiments, virtual disk layer 140 may simply close one or more files representing the virtual disk to clear any outstanding I/O operations.

At step 206, virtual disk layer 140 determines whether the target virtual disk to which the running virtual disk is to be consolidated is a delta disk. As used herein, the target virtual disk represents the combined disk chain of base disk and any delta disks, up to and excluding the delta disk to be consolidated and removed. Typically, the target virtual disk is the parent disk in the disk chain preceding the delta disk to be consolidated, i.e., the running virtual disk. In contrast, the running virtual disk represents the combined disk chain of base disk and delta disks up to and including the delta disk to be consolidated and removed. The running virtual disk is the current virtual disk read from and written to by the running VM, and is accessed using a disk handle to that delta disk.

In some embodiments, virtual disk layer 140 may determine the target virtual disk is a delta disk based on the disk format of the target virtual disk. For example, virtual disk layer 140 may determine the target virtual disk is a delta disk if the target virtual disk has a sparse format, although it is noted that other disk formats may be indicative of a delta disk.

Figure 3B:
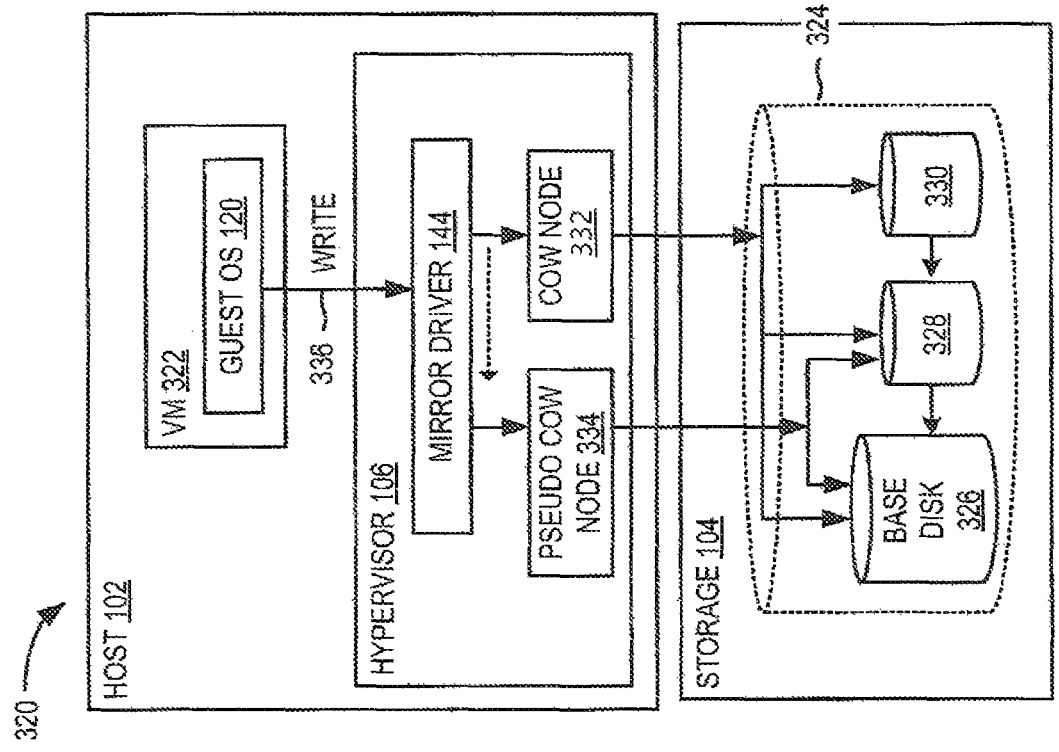
FIGS. 3A and 3B are block diagrams depicting computer systems for consolidating snapshots of virtual machines, according to embodiments of the present disclosure.
Figure 3A:
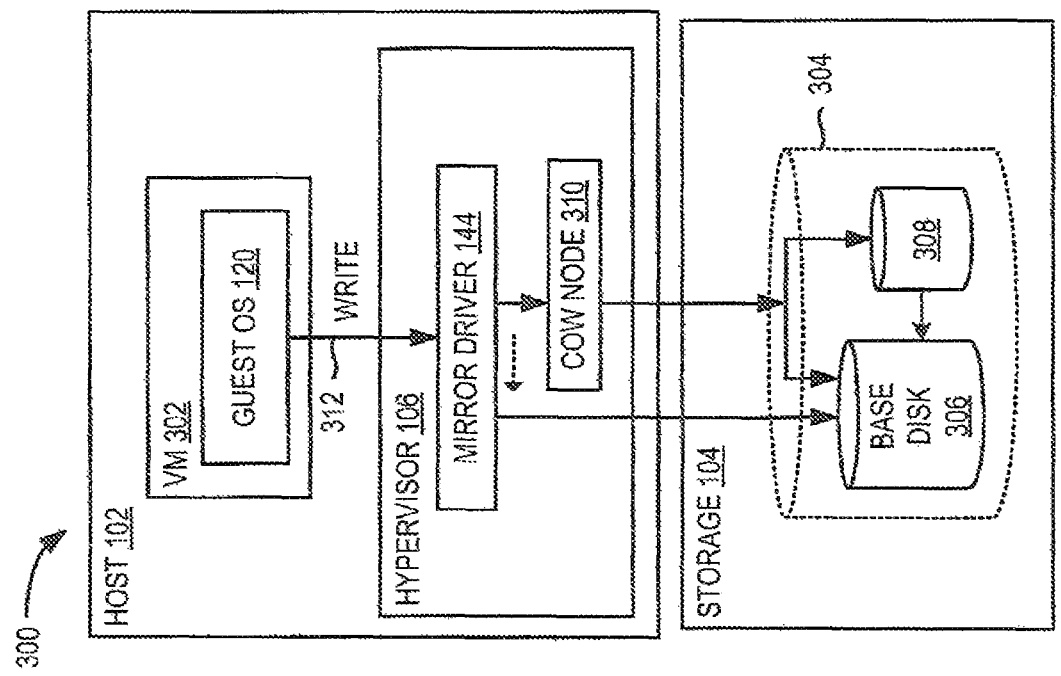

At step 208, responsive to determining that the target virtual disk is a delta disk (i.e., of the sparse format), virtual disk layer 140 creates a disk handle to the target virtual disk which is configured to support copy-on-write behavior such that reads and writes may be performed to the target virtual disk using the disk handle. In one embodiment, virtual disk layer sets up a "pseudo" copy-on-write (COW) device node, which is a type of disk handle referred to in devfs terminology as a device node, associated with the target virtual disk. The COW node is referred is a "pseudo" because the node provides only a partial view of the disk chain that excludes the delta disk to be consolidated, as shown in FIGS. 3A and 3B.

In cases where the target virtual disk is a flat file (i.e., not a delta disk), a pseudo COW node is not required because reads and writes may be performed directly to the flat file. As such, responsive to determining the target virtual disk is not a delta disk, virtual disk layer 140 may use a conventional disk handle to the target virtual disk.

At step 210, virtual disk layer 140 creates a mirror driver 144 between the target virtual disk and the running virtual disk. In one embodiment, virtual disk layer 140 sets up mirror driver 144 between a disk handle to the target virtual disk (which may be the pseudo COW node or other disk handle) and a disk handle to the current running virtual disk. The current disk handle may represent the disk chain comprising the base disk and the delta disk to be consolidated. The target disk handle may represent the target disk in the disk chain into which the delta disk is to be consolidated.

At step 212, virtual disk layer 140 un-stuns the VM. At step 214, virtual disk layer 140 copies allocated sectors from the delta disk to the target disk in a single iteration. This copying process is performed while the virtual machine is still running (hence "online" snapshot consolidation). The copying process may be referred to as an "in-place" consolidation because the process may be performed without creating additional helper writable disks, unlike known techniques described above.

In one embodiment, virtual disk layer 140 requests mirror driver 144 to copy the data from the running virtual disk to the target virtual disk. In some embodiments, a separate data mover daemon or module may be used to efficiently copy the data blocks in the background while the VM is running In one implementation, a data mover daemon may be a kernel service that copies disk blocks between locations using direct memory access (DMA) or through hardware offload APIs provided by storage system 104. One example of a data mover daemon may be the DataMover product made available by VMware, Inc. of Palo Alto, Calif. This may ensure more efficient copying by offloading disk operations to vendor-provided storage plug-ins supported by the data mover daemon. An example copy operation is described later in conjunction with FIG. 4.

While the data sectors are being copied for the running virtual disk to the target virtual disk, hypervisor 106 may receive one or more disk requests from guest OS 120 in the running VM to write data to the current disk handle. At step 216, mirror driver 144 mirrors any new write requests received from guest OS 120 in the running VM to both the target virtual disk and the running virtual disk. That is, responsive to receiving a disk request to write data to the current disk handle, mirror driver 144 replicates the disk request to create another disk request (i.e., mirroring) to write the same data to the target disk handle. As such, the target virtual disk is updated with ongoing or new writes from guest OS 120 without having to perform more iterations of copying. Mirror driver 144 may mirror the writes and wait for acknowledgements from both the running virtual disk and the target virtual disk before communicating the write acknowledgement to the guest OS.

FIGS. 3A and 3B are block diagrams depicting computer systems 300, 320 for consolidating snapshots of virtual machines, according to embodiments of the present disclosure. As shown in FIG. 3A, computer system 300 includes a host 102 running a virtual machine 302 with one taken snapshot. VM 302 is on-line and uses a virtual disk 304 that represents a combined disk chain comprised of a base disk 306 and a delta disk 308. During normal operation of VM 302, reads and writes sent to virtual disk 304 from guest OS 120 are processed using a disk handle, depicted as COW node 310, to the running virtual disk.

In this example, the virtual disk layer (not shown) deletes the snapshot of VM 302, and initiates a process that consolidates delta disk 308 (i.e., the running virtual disk) to base disk 306 (i.e., the target virtual disk). Because base disk 306 is a flat file (i.e., not a delta disk), the virtual disk layer does not need to create a pseudo COW node. Rather, the virtual disk layer instantiates a mirror driver 144 between base disk 306 and COW node. As sectors are copied from delta disk 308 to base disk 306, mirror driver 144 replicates any writes from guest OS 120 (depicted as arrow 312) for COW node 310 to the disk handle for base disk 306. As such, sectors of base disk 306 are updated with any new writes from running VM 302. When receiving reads from guest OS 120 in the running VM, the reads continue to be handled and directed to COW node 310 while mirror driver 144 is in place. That is, mirror driver 144 uses the disk handle to the running virtual disk for reads and does not replicate the reads to the target virtual disk.

FIG. 3B depicts a computer system 320 having a host 102 running a virtual machine 322 with one or more taken snapshots. Similar to VM 302, VM 322 is on-line and using a virtual disk 324 that represents a combined disk chain of a base disk 326, a first delta disk 328, and a second delta disk 330. During operations of VM 322, reads and writes sent to virtual disk 324 are processed using a disk handle depicted as COW node 310 to the running virtual disk.

In this example, the virtual disk layer deletes the latest snapshot of VM 322, which initiates a process that consolidates the second delta disk 330 (i.e., the running virtual disk) into the first delta disk 328 (i.e., the target virtual disk). In contrast to the example shown in FIG. 3A, the target virtual disk in this case is a delta disk. As such, the virtual disk layer sets up a pseudo COW node 334 such that reads and writes can be performed to the target virtual disk. Pseudo COW node 334 represents a subset of the disk chain comprised of the target virtual disk (i.e., delta disk 328) and its parent (i.e., base disk 326).

The virtual disk layer sets up mirror driver 144 between COW node 310, which is the disk handle for the current running virtual disk, and pseudo COW node 334, which is the disk handle for the target running disk. As sectors are copied from delta disk 330 to its parent delta disk 328, mirror driver 144 replicates any writes from guest OS 120 (depicted as arrow 336) for COW node 310 to pseudo COW node 334. As a result, sectors of the target virtual disk are updated with any new writes from running VM 322 according to copy-on-write techniques supported by pseudo COW node 334.

Figure 4:
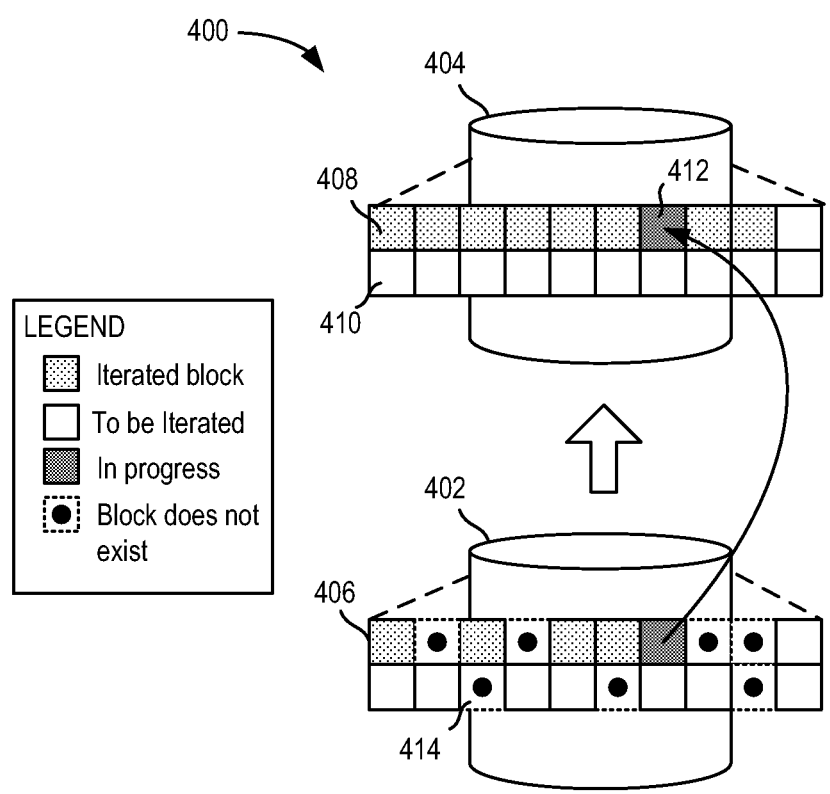
FIG. 4 is a block diagram depicting operations for copying data sectors of consolidating snapshots, according to one embodiment of the present disclosure.

FIG. 4 is a block diagram depicting operations for copying data sectors of consolidating snapshots, according to one embodiment of the present disclosure. FIG. 4 illustrates a virtual disk 400 comprising a first delta disk 402 being consolidated with a virtual disk 404. In one example, delta disk 402 is a sparse format disk file (e.g., VM-001.vmdk) and virtual disk 404 is a disk file (e.g., VM.vmdk) representing a previous snapshot of the virtual disk. As shown, delta disk 402 comprises a plurality of sectors 406 of disk data corresponding to changes to the virtual disk since the snapshot was taken. The data mover daemon performs a data copying process which iterates through the plurality of sectors 406 contained in delta disk 402 and copies each sector to target virtual disk 404. Sectors 406 may be copied one at a time, or multiple sectors 406 at a time, depending on the size of sectors and configurations of storage system 104.

As shown in FIG. 4, at any given point in time during this copying process, some sector(s) have been iterated through and copied (e.g., block 408), some sector(s) have not yet been iterated to (e.g., block 410), some sector(s) are currently being copied (e.g., block 412), and some sector(s) do not exist in delta disk 402 (e.g., block 414) because that sectors has not yet been written to and changed.

Data consistency is maintained with the data mover daemon scanning and copying data from delta disk 402 while the guest writes are written to both copies (delta disk 402 and virtual disk 404). In one embodiment, mirror driver 144 may be configured to give preference to data mover I/O, and defer any guest writes that would overlap with the disk region that is actively being copied. In one particular embodiment, mirror driver 144 may implement a locking scheme to avoid consistency issues between data mover I/O and guest I/O. For the duration of a given data mover region copy (e.g., 64 MB in logical block addressing space), mirror driver 144 may treat the region as "locked," deferring any guest I/O attempts until after the data mover copy completes. As soon as the data mover copy for that region completes, the data mover daemon unlocks the region, and allows guest I/O to flow through (and be mirrored), then advances to the next region (e.g., the next 64 MB region).

In some cases, the data mover daemon may encounter sectors 406 of delta disk 402 whose data was written during the copying of other sectors, i.e., the writes were mirrored to both delta disk 402 and virtual disk 404. There is no loss in data consistency because the data mover daemon would simply re-write the block to the destination virtual disk 404 with data the virtual disk already has. In some embodiments, the data mover daemon may keep track of whether a write to a sector 406 has been mirrored already to both delta disk 402 and virtual disk 404, and skip the copying of that sector 406.

Furthermore, data consistency and integrity is maintained in the presence of any disruptive events, such as host power cycling, while mirror driver 144 is in place. After the snapshot metadata is deleted (e.g., in step 202), the disk chain is still consistent because any disks that were referenced by that snapshot are no longer accessed directly. The reads that will be made to this disk again will be through a child (delta disk), which has a consistent view of the disk. The delta disks are not "re-parented" until after the consolidation process has been completed. If a power failure or other power cycling event occurs, the consolidation process may be restarted.

While embodiments of the present disclosure describe a snapshot consolidation technique applied to a running VM having a single virtual disk, the technique may be applied to a snapshot of a running VM having multiple virtual disks. In such embodiments, deleting the snapshot consolidates a corresponding delta disk for each of the multiple virtual disks using the technique described above. Furthermore, although the technique is described being applied to the last virtual disk in the disk chain (i.e., the latest snapshot), it is noted that application of the described technique need not be limited to the last delta disk in the disk chain. As such, embodiments of the present disclosure may be applied to any of snapshot of a virtual machine that is deleted, that is, any virtual disk in the disk chain.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for consolidating snapshots of a virtual machine, comprising:
   creating a mirror driver between a current disk handle representing a virtual disk chain comprising a base virtual disk and a delta disk, wherein the delta disk does not include content present in the base virtual disk, and a target disk handle representing a target virtual disk in the virtual disk chain into which the delta disk is to be consolidated;
   in a single iteration, performing both:
      copying sectors from the delta disk to the target virtual disk while the virtual machine is running; and
      while the sectors are being copied, responsive to receiving a first disk request from the virtual machine to write data to the current disk handle, the mirror driver replicating the first disk request to create a second disk request to also write the data to the target disk handle such that each write request is sent to both the current disk handle and the target disk handle.

2. The method of claim 1, wherein the target virtual disk is the base virtual disk.

3. The method of claim 1, wherein the target virtual disk is a second delta disk in the virtual disk chain that is a parent of the delta disk to be consolidated.

4. The method of claim 3, further comprising,
   responsive to determining that the target virtual disk is the second delta disk in the disk chain, generating the target disk handle comprising a copy-on-write device node representing a subset of the virtual disk chain comprising the base virtual disk and the second delta disk and not the delta disk to be consolidated.

5. The method of claim 1, where the current disk handle comprises a copy-on-write device node representing the virtual disk chain comprising the base virtual disk and the delta disk.

6. The method of claim 1, further comprising:
   prior to creating the mirror driver, stunning a virtual disk of the virtual machine comprising the virtual disk chain.

7. The method of claim 1, further comprising:
   deleting the delta disk to be consolidated in response to completing copying the sectors from the delta disk to the target virtual disk.

8. The method of claim 1, wherein replicating the first disk request to create the second disk request to write the data to the target disk handle further comprises:
   executing the first disk request using the current disk handle and the second disk request using the target disk handle, resulting in writing the same data to two locations.

9. The method of claim 1, wherein copying the sectors from the delta disk to the target virtual disk is performed without creating an additional helper delta disk.

10. A non-transitory computer readable storage medium having stored thereon computer software executable by a processor, the computer software embodying a method for consolidating snapshots of a virtual machine, the method comprising:
   creating a mirror driver between a current disk handle representing a virtual disk chain comprising a base virtual disk and a delta disk, wherein the delta disk does not include content present in the base virtual disk, and a target disk handle representing a target virtual disk in the virtual disk chain into which the delta disk is to be consolidated;
   in a single iteration, performing both:
      copying sectors from the delta disk to the target disk while the virtual machine is running; and
      while the sectors are being copied, responsive to receiving a first disk request from the virtual machine to write data to the current disk handle, the mirror driver replicating the first disk request to create a second disk request to also write the data to the target disk handle, such that write each write request is sent to both the current disk and target disk handle.

11. The non-transitory computer readable storage medium of claim 10, wherein the target virtual disk is the base virtual disk.

12. The non-transitory computer readable storage medium of claim 10, wherein the target virtual disk is a second delta disk in the virtual disk chain that is a parent of the delta disk to be consolidated.

13. The non-transitory computer readable storage medium of claim 12, wherein the method further comprises:
responsive to determining that the target virtual disk is the second delta disk in the disk chain, generating the target disk handle comprising a copy-on-write device node representing a subset of the virtual disk chain comprising the base virtual disk and the second delta disk and not the delta disk to be consolidated.

14. The non-transitory computer readable storage medium of claim 10, where the current disk handle comprises a copy-on-write device node representing the virtual disk chain comprising the base virtual disk and the delta disk.

15. The non-transitory computer readable storage medium of claim 10, wherein the method further comprises:
prior to creating the mirror driver, stunning a virtual disk of the virtual machine comprising of the virtual disk chain.

16. The non-transitory computer readable storage medium of claim 10, wherein the method further comprises:
deleting the delta disk to be consolidated in response to completing copying the sectors from the delta disk to the target virtual disk.

17. The non-transitory computer readable storage medium of claim 10, wherein copying the sectors from the delta disk to the target virtual disk is performed without creating an additional helper delta disk.

18. A computer system for consolidating snapshots of a virtual machine, the computer system comprising:
a storage device storing a virtual disk chain comprising a base virtual disk and a delta disk, wherein the delta disk does not include content present in the base virtual disk, associated with a virtual machine; and
a processor programmed to carry out the operations of:
creating a mirror driver between a current disk handle representing the virtual disk chain and a target disk handle representing a target virtual disk in the virtual disk chain into which the delta disk is to be consolidated;
in a single iteration, performing both:
copying sectors from the delta disk to the target virtual disk while the virtual machine is running; and
while the sectors are being copied, responsive to receiving a first disk request from the virtual machine to write data to the current disk handle, the mirror driver replicating the first disk request to create a second disk request to also write the data to the target disk handle, such that each write request is sent to both the current disk handle and the target disk handle.

19. The computer system of claim 18, wherein the processor is further programmed to carry out the operations of:
prior to creating the mirror driver, stunning a virtual disk of the virtual machine comprising the virtual disk chain; and
responsive to determining that the target virtual disk is a second delta disk in the virtual disk chain, generating the target disk handle comprising a copy-on-write device node representing a subset of the virtual disk chain comprising the base virtual disk and the second delta disk and not the delta disk to be consolidated.

20. The computer system of claim 18, wherein copying the sectors from the delta disk to the target virtual disk is performed without creating an additional helper delta disk.

* * * * *